(12) United States Patent
Sung (10) Patent No.: US 7,953,278 B2
(45) Date of Patent: May 31, 2011

(54) FACE RECOGNITION METHOD AND APPARATUS

(75) Inventor: Young-hun Sung, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1126 days.

(21) Appl. No.: 11/269,570

(22) Filed: Nov. 9, 2005

(65) Prior Publication Data

US 2006/0104504 A1 May 18, 2006

(30) Foreign Application Priority Data

Nov. 16, 2004 (KR) .................. 10-2004-0093609

(51) Int. Cl.
*G06K 9/00* (2006.01)
(52) U.S. Cl. ...................................... 382/181
(58) Field of Classification Search .......... 382/181
See application file for complete search history.

(56) References Cited

U.S. PATENT DOCUMENTS

2003/0128396 A1* 7/2003 Fan .............................. 358/3.27
2003/0139828 A1* 7/2003 Ferguson et al. ............... 700/53

FOREIGN PATENT DOCUMENTS

| KR | 2001-0087487 | 9/2001 |
| KR | 2002-0089295 | 11/2002 |

OTHER PUBLICATIONS

Korean Notice of Examination Report for corresponding Korean Patent Application No. 2004-0093609 dated Feb. 24, 2006.

* cited by examiner

*Primary Examiner* — Vikkram Bali
*Assistant Examiner* — Elisa M Rice
(74) *Attorney, Agent, or Firm* — Staas & Halsey LLP

(57) ABSTRACT

A face recognition that is robust to external illumination variations is provided. The face recognition apparatus includes a face localizer extracting a predetermined number of feature points from a facial region extracted from an input image, a Gabor filter unit applying a set of Gabor filters with a plurality of orientations and frequencies to each of the facial feature points in order to obtain filter responses and generates a one-dimensional (1-D) vector consisting of the filter responses, a training data set storage storing the 1-D vector when the gaber-filtered 1-D vector is obtained from a training image, and a binary classifier generating a binary determination criterion using the stored 1-D vector, applying the binary determination criterion to the 1-D vector when the gaber-filtered 1-D vector is obtained from an image to be recognized and determining the identity of the image to be recognized.

19 Claims, 6 Drawing Sheets

FACE RECOGNITION METHOD AND APPARATUS

CROSS-REFERENCE TO RELATED APPLICATIONS

This application claims the benefit of Korean Patent Application No. 10-2004-0093609, filed on Nov. 16, 2004 in the Korean Intellectual Property Office, the disclosure of which is incorporated herein by reference.

BACKGROUND OF THE INVENTION

1. Field of the Invention

The present invention relates to the field of image processing, and more particularly, to a face recognition method robust to external illumination variation, using a facial image transformed by a Gabor filter as an input to a binary classifier to determine whether the input facial image is the same as a facial image stored in a database.

2. Description of the Related Art

With the advancement of information society, identification technology that can distinguish a person from other people is becoming increasingly important. A biometric is a measurement of any physical characteristic or personal trait of an individual that can be used to protect personal information or authenticate the identity of that individual using computer technology. Different forms of biometrics are well known and face recognition particularly provides several advantages, including identification technology in a non-contact manner, making it convenient and competitive, compared to other forms of biometrics such as fingerprint or iris scan, requiring individual's specific action or behavior. The facial recognition technology, which is an important component of multimedia database retrieval systems, is becoming more important as a variety of applications, including face-based motion video extraction, identification, Human Computer Interface (HCI) image retrieval, security, and monitoring systems.

However, the face recognition results are very sensitive to variations in internal factors such as identity, age, race, facial expression, and jewelry, and in external environment such as pose, illumination, and image process. In particular, since external illumination variations pose a significant challenge to face recognition algorithms, there is an urgent need to develop an algorithm that is robust to external illumination variations.

A representative example of face recognition method that is robust against external illumination changes is face recognition using Gabor filter (hereinafter referred to as 'Gabor filtering'). The Gabor filtering is very robust to external illumination variations because it is based on mathematical modeling for response characteristics of a simple cell of a human eye. This technique that is also one of face recognition algorithms is now being used extensively in various applications.

Compared to face recognition methods such as Principal Component Analysis (PCA) using the overall configuration of a face, Gabor filtering, which is robust to external illumination variations, however, provides less accurate recognition result than binary classification based on statistical probability. The probability-based binary classification provides high accuracy in face recognition by minimizing experimental cumulative error and reducing the complexity of a hypothesis space.

Examples of binary classification include Support Vector Machines (SVM) and Nearest Neighbor (NN). SVM is more widely used in face recognition field. Binary classification is an approach that uses facial and non-facial training data sets to detect a facial region from an input image. A NN approach is used to classify an image into facial and non-facial regions by determining whether the result of NN classification is similar to that from a training data set for the existing facial image. While binary classification is used to decide whether an image belongs to a facial or non-facial region, it may be employed to verify the identity of a facial image by determining whether the facial image belongs to the same or different person.

SVM binary classification is a very promising face recognition technique in a field requiring recognition accuracy rather than speed. Since SVM has a significantly large amount of data to be processed compared to PCA or Gabor filtering, it may not be suitable for real-time face recognition or high-speed face recognition. However, this limitation is relaxed to some extent with the overwhelming improvements in microcomputer.

However, while binary classification exhibits excellent face recognition performance compared to other methods under general conditions, it provides significantly reduced performance under different illumination conditions. This is because binary classification still uses pixel intensity (gray level) as an input vector under changing illumination conditions. Preprocessing techniques such as histogram equalization and RetineX are used to overcome this problem but cannot offer a complete solution.

SUMMARY OF THE INVENTION

The present invention provides a face recognition method and apparatus that are robust to external illumination variations while providing high recognition accuracy.

The present invention also provides a binary classification method using a Gabor-filtered image as an input.

The above stated objects as well as other objects, features and advantages, of the present invention will become clear to those skilled in the art upon review of the following description.

According to an aspect of the present invention, there is provided a face recognition apparatus including a face localizer extracting a predetermined number of feature points from a facial region extracted from an input image, a Gabor filter unit applying a set of Gabor filters with a plurality of orientations and frequencies to each of the facial feature points in order to obtain filter responses and generates a one-dimensional (1-D) vector consisting of the filter responses, a training data set storage storing 1-D vector when the gaber-filtered 1-D vector is obtained from a training image, and a binary classifier generating a binary determination criterion using the stored 1-D vector, applying the 1-D vector to the binary determination criterion when the gaber-filtered 1-D vector is obtained from an image to be recognized and determining the identity of the image to be recognized.

According to another aspect of the present invention, there is provided a face recognition method including extracting a predetermined number of feature points from a facial region extracted from an input image, applying a set of Gabor filters with a plurality of orientations and frequencies to each of the facial feature points and obtaining filter responses, generating a one-dimensional (1-D) vector consisting of the filter responses, storing the 1-D vector when the gaber-filtered 1-D vector is obtained from a training image, generating a binary determination criterion using the stored 1-D vector, and applying the binary determination criterion to the 1-D vector when the gaber-filtered 1-D vector is obtained from an image to be recognized and determining the identity of the image to be recognized.

According to another aspect of the present invention, there is provided a method, including extracting a predetermined number of feature points from a facial region extracted from an input image, generating a binary determination criterion using stored 1-D vectors, and applying the binary determination criterion to the 1-D vectors when gaber-filtered 1-D vectors are obtained from an image to be recognized and determining the identity of the image to be recognized.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
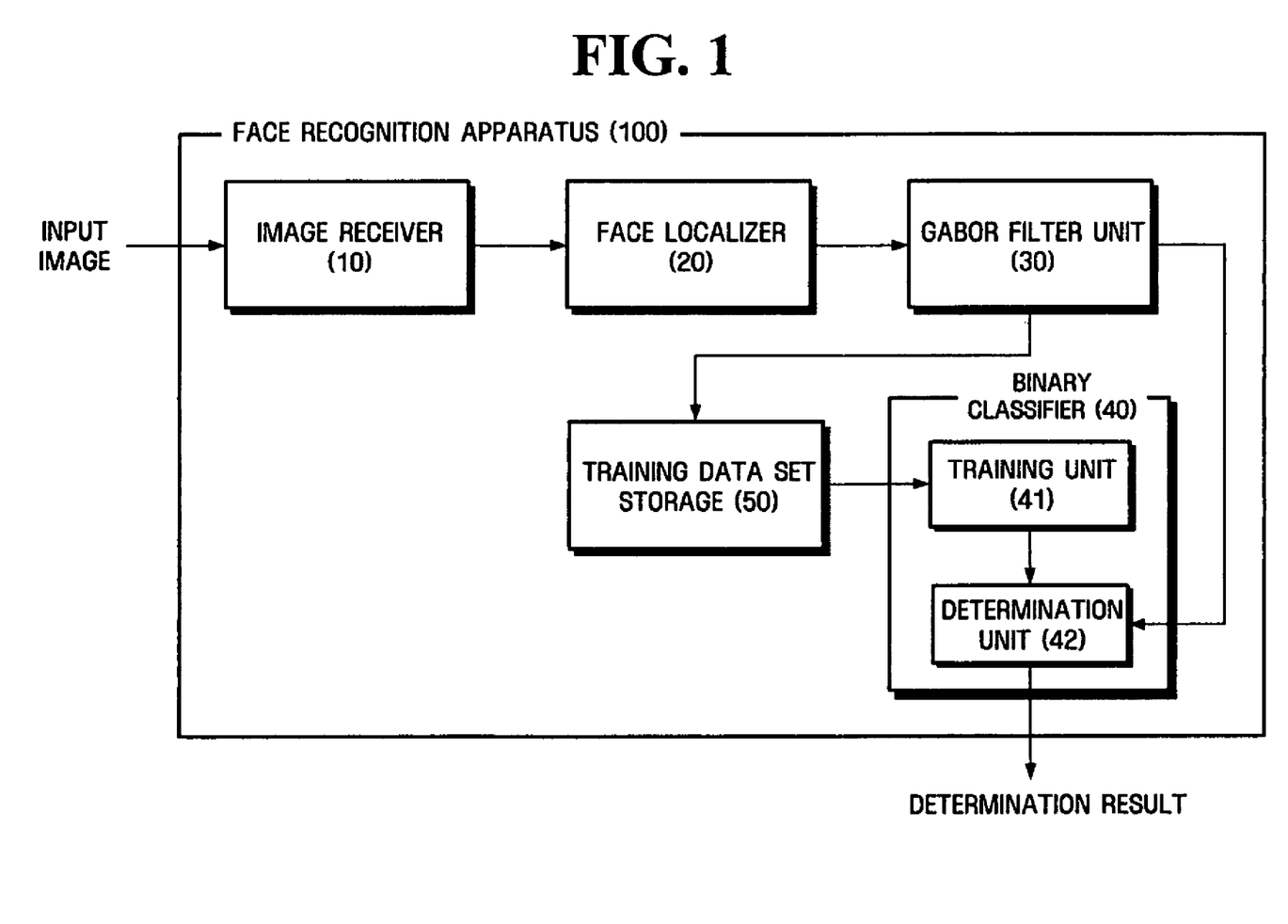
FIG. 1 is block diagram illustrating a face recognition apparatus according to an embodiment of the present invention.

In FIG. 1, a face recognition apparatus 100 according to an embodiment of the present invention includes an image receiver 10, a face localizer 20, a Gabor filter unit 30, a binary classifier 40, and a training data set storage 50. The binary classifier 40 comprises a training unit 41 and a determination unit 42.

Figure 2:
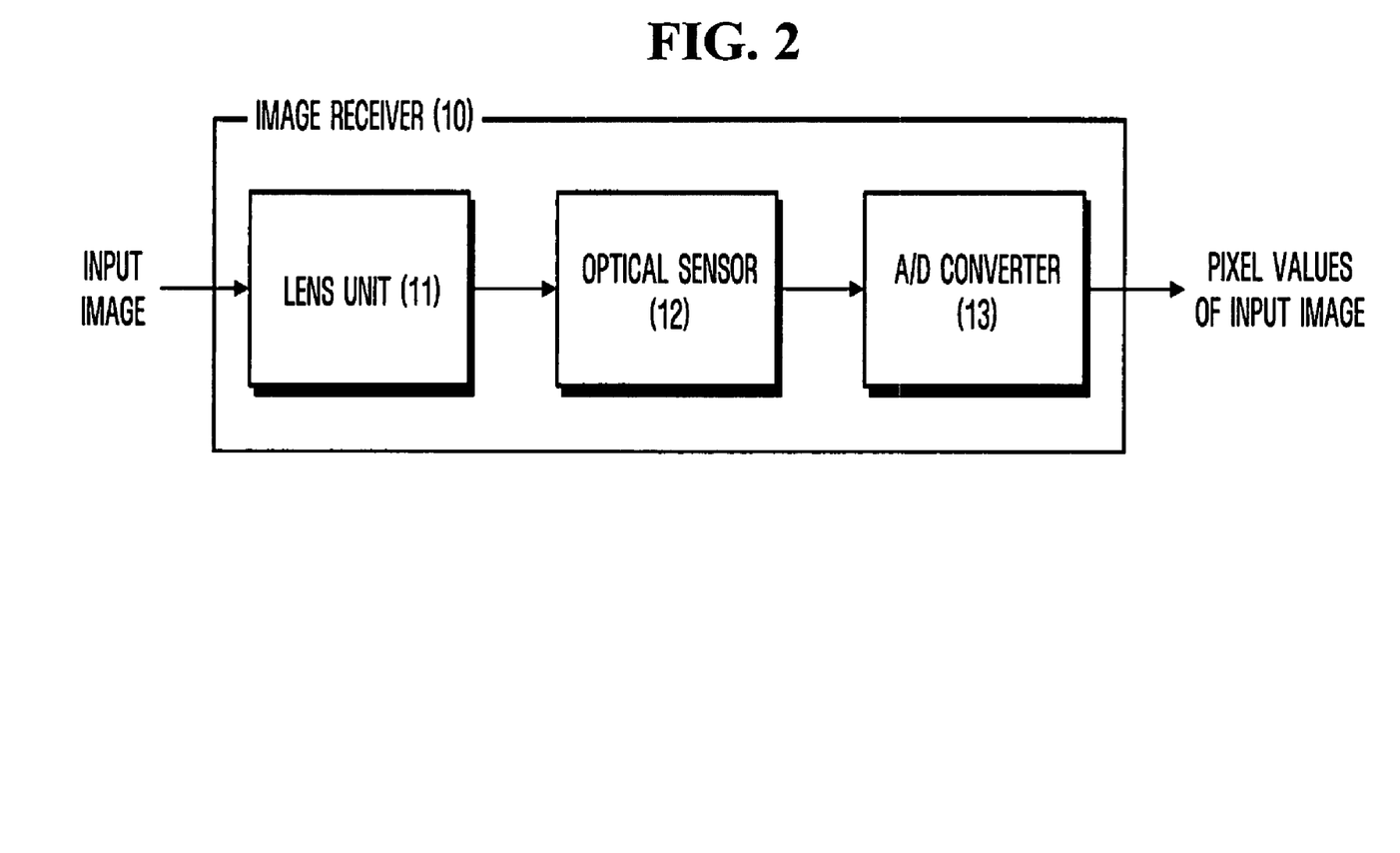
FIG. 2 is a block diagram illustrating the detailed configuration of the image receiver shown in FIG. 1.

The image receiver 10 receives an input image containing a facial image and transforms the input image into pixel values. In FIG. 2, the image receiver 10 includes a lens unit 11 transmitting the input image, an optical sensor 12 transforming an optical signal corresponding to the transmitted input image into an electric signal (image signal) and outputting the electric signal, and an analog-to-digital (A/D) converter 13 converting the electric signal into a digital signal. Here, the optical sensor 12 performs functions of a camera, including exposure, gamma control, gain control, white balance, and color matrix and may be realized by a charge-coupled device (CCD) module or complementary metal oxide semiconductor (CMOS) module.

Figure 3:
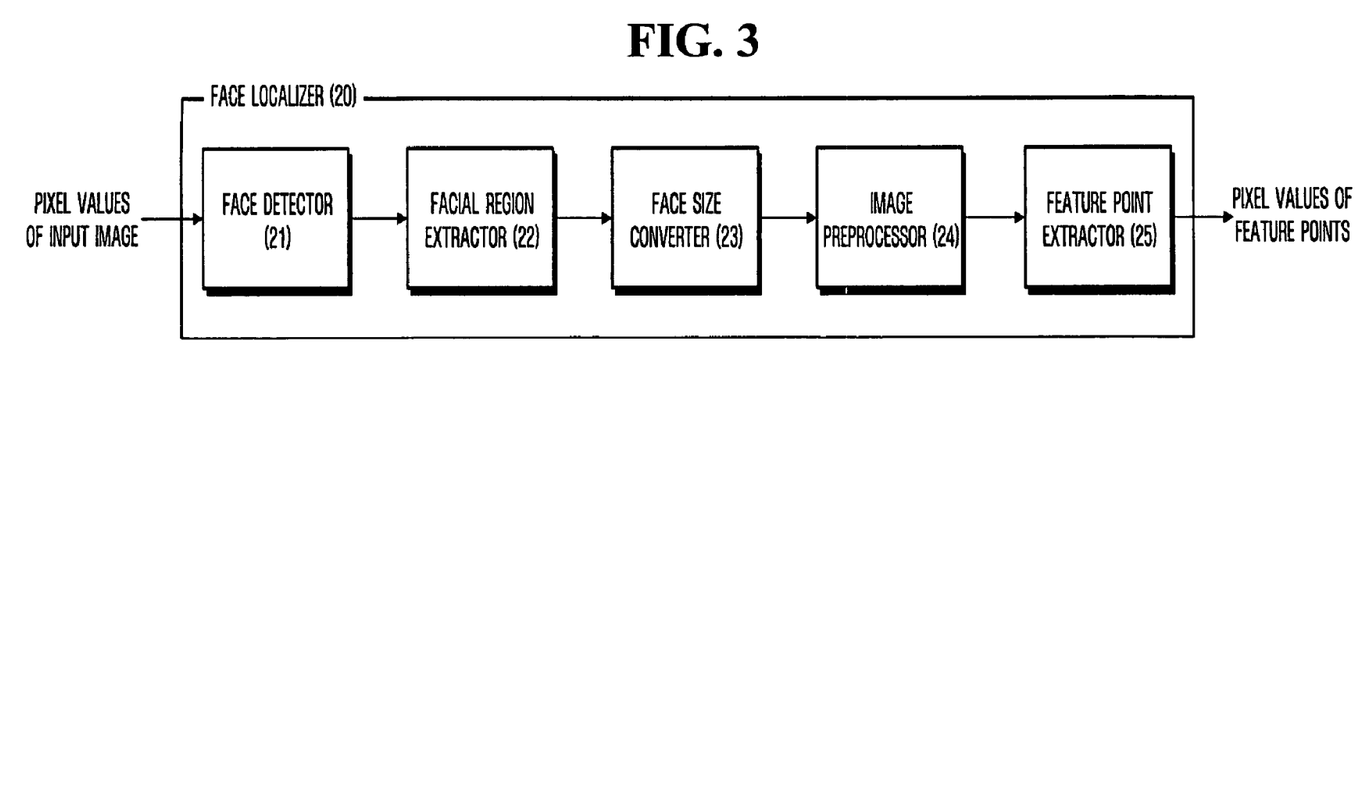
FIG. 3 is a block diagram illustrating the detailed configuration of the face localizer shown in FIG. 1.

The face localizer 20 extracts a predetermined number of feature points from a facial region derived from the input image. FIG. 3 is a block diagram showing the detailed configuration of the face localizer 20. In FIG. 3, the face localizer 20 includes a face detector 21, a facial region extractor 22, a face size converter 23, an image preprocessor 24, and a feature point extractor 25.

The face detector 21 detects a specific local component of a face from the input image represented by pixel values. For example, both eyes are detected from a facial image to then be used as criteria in extracting other facial components. If a facial image is contained in an input image, eyes having a distance within a predetermined range can be located.

The facial region extractor 22 extracts a facial region to maintain a predetermined ratio with respect to the location of the specific facial component detected by the face detector 21. For example, when the location of both eyes is detected by the face detector 21, the distance between the eyes can also be obtained. In preprocessing of face recognition, the facial region is cut from the input image based on the distance between both eyes, which is for the purpose of minimizing the effect of image background or a person's hair style.

For example, assuming that the distance between both eyes is 2D, the outer corners of the left eye and the right eye, a distance between an upper face boundary and either the left or right eye, and a distance between a lower face boundary and either the left or right eye are set to D, 1.5*D, and 3*D, respectively, thereby suitably cutting the facial region for face recognition. In this case, it is possible to clearly represent facial features such as eyebrows, eyes, nose, and lips with numerically small proportions while minimizing the background.

The face size converter 23 converts either or both of the size of the facial region extracted by the facial region extractor 22 and the size of a Gabor filter that will be subsequently applied to maintain a predetermined ratio between them. For example, the size of the facial region may be changed according to the size of a 2-D Gabor filter. That is, an image size is changed to maintain a predetermined ratio between the size of a specific facial feature, e.g., the distance between both eyes, and the size of 2-D Gabor filter. Alternatively, a Gabor filter size or spatial resolution may be changed.

The image preprocessor 24 applies histogram equalization to the facial region passing through the face size converter 23 in order to reduce the effect of illumination. The brightness of input images may vary according to illumination conditions or a single input image may be divided into a high-brightness region and a low-brightness region. To reduce the effect of illumination, brightness distribution for each pixel in the facial region is analyzed to obtain a histogram and histogram equalization is performed on frequent brightness values.

Since only a Gabor filter is used to reduce the effect of illumination, the image preprocessor 24 is an optional element but can be used auxiliarily within the face localizer 20.

The feature point extractor 25 extracts a predetermined number of feature points that are to be subjected to Gabor filtering from the facial region preprocessed by the image preprocessor 24. Through experiments conducted on multiple persons, the feature points may be extracted from the facial region in such a way as to increase the difference in the Gabor-filtered output between input facial images. The performance of face recognition can further be improved by making a clear difference between facial images in terms of outputs obtained as a result of applying a Gabor filter to the selected feature points.

Figure 4:
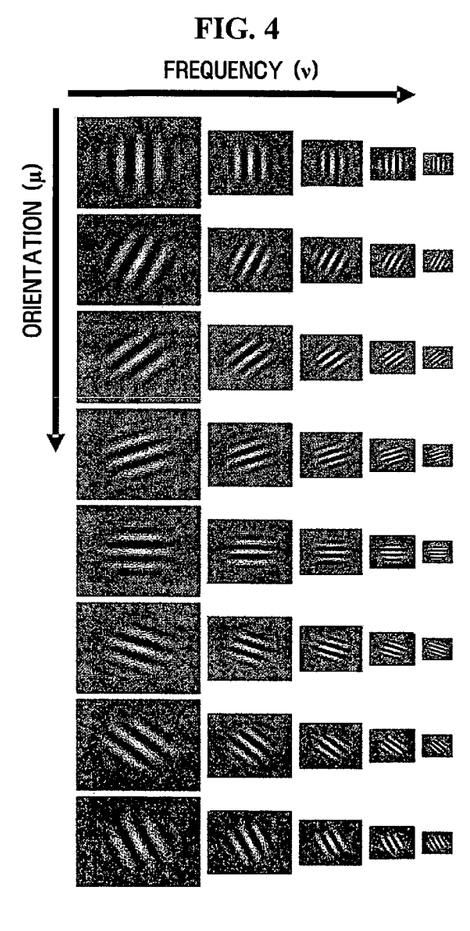
FIG. 4 illustrates an example of a set of Gabor filters.

The Gabor filter unit 30 applies a set of Gabor filters with a plurality of orientations and frequencies to each of the facial feature points extracted by the feature point extractor 25 in order to obtain filter responses and generates a one-dimensional (1-D) vector or array consisting of the filter responses. Typically, a filter response $P_j(x)$ from a Gabor filter is defined by Equation (1):

$$P_j(x) = \frac{k_j^2}{\sigma^2}\exp\left(\frac{-k_j^2 x^2}{2\sigma^2}\right)\left[\exp(ik_j x) - \exp\left(-\frac{\sigma^2}{2}\right)\right] \quad (1)$$

$$k_j = \begin{pmatrix} k_{jx} \\ k_{jy} \end{pmatrix} = \begin{pmatrix} k_v \cos\phi_\mu \\ k_v \sin\phi_\mu \end{pmatrix}$$

$$k_v = 2^{-\frac{v+2}{2}}, \quad \phi_\mu = \mu\frac{\pi}{8}, \quad j = \mu + 8v$$

where $k_v$ and $\phi_\mu$ denote frequency and orientation, respectively. For example, when v is in the range of 1 to 4 and is in the range of 0 to 7, a set of 40 Gabor filters are used. FIG. 4 shows an example of a set of Gabor filters or wavelet patterns. Referring to FIG. 4, since there are 5 patterns in frequency direction and 8 patterns in orientation direction, 40 wavelet patterns are created.

The Gabor filter 30 applies Equation (1) to each of the feature points extracted from the face localizer 20 to obtain filter responses and represents the filter responses by a 1-D vector or array (hereinafter referred to as a 'Gabor-filtered vector'). The Gabor-filtered vector corresponds to one training image or input image to be recognized and consists of k filter responses. If 40 Gabor filters are applied to each of 20 feature points, the number k of filter responses is 800.

When the Gabor-filtered vector is obtained from a training image, the Gabor filter 30 stores the vector in the training data set storage 50. On the other hand, when the Gabor-filtered vector is obtained from the image to be recognized, the vector is then sent to the determination unit 42 of the binary classifier 40.

The training data set storage 50 repeatedly stores Gabor-filtered vectors, i.e., training data sets, provided by the Gabor filter unit 30 during a period when training image is input. The training data set storage 50 stores a Gabor-filtered vector together with a target value (y value in Equation (2)) in the Gabor-filtered vector and provides the training data sets to the training unit 41 generating a binary determination criterion when the input of training images terminates. Here, the target value can either be positive or negative. For example, a target value of 1 is assigned to a training data set for a selected facial image while a target value of −1 is assigned to that for a facial image other than the selected one.

The binary classifier 40 includes the training unit 41 generating a binary determination criterion using Gabor-filtered vectors stored in the training data set storage 50 for a plurality of training images and a determination unit 42 receiving a Gabor-filtered vector for an image to be recognized from the Gabor filter unit 30, applying the binary determination criterion to the Gabor-filtered vector, and determining whether a facial image contained in the image to be recognized belongs to a specific person (the identity of the facial image).

When the binary classifier 40 is a Support Vector Machines (SVM) classifier, the training unit 41 finds an optimal hyperplane and the determination unit 42 substitutes an input Gabor-filtered vector into an equation describing the optimal hyperplane and determines whether the resultant value exceeds a predetermined threshold. SVM separates a training data set into two classes by one optimal hyperplane. In the present invention, the optimal hyperplane may separate two classes: a class determined that a facial image belongs to a specific person and a class not determined that the facial image belongs to the specific person.

A process of obtaining a hyperplane will now be described with reference to Equations (2) through (10). A training data set input to the SVM classifier 40 is a Gabor-filtered vector obtained from a training image fed through the image receiver 10, i.e., a Gabor-filtered vector for a training data set. The training data set is defined by Equation (2):

$$(y_1, x_1), \ldots, (y_l, x_l), x \in R^n, y \in \{-1, +1\} \quad (2)$$

where $x_i$ and $y_i$ are respectively a Gabor-filtered vector for each of l training images and a target value. As described earlier, the target value of 1 is assigned to a training data set for a selected facial image and −1 is assigned to a training data set for an image other than the selected facial image.

Gabor-filtered vector $x_i$ consists of k components (filter responses). When the two classes are linearly separable, the two classes can be separated by a hyperplane described by Equation (3):

$$(w \cdot x) - b = 0 \quad (3)$$

where w is a normal vector to the hyperplane and b is a constant.

An optimal hyperplane is one that maximizes the distance between the hyperplane and the nearest data point. Data points nearest to the optimal hyperplane are called support vectors.

To determine w and b for an optimal hyperplane in Equation (3), Equation (4) must be solved:

$$\min_{w,b} \frac{1}{2}\|w\|^2, \quad \text{subject to} \quad y_i(w \cdot x_i - b) \geq 1 \quad (4)$$

Here, $\|w\|^2$ is the square of the magnitude of normal vector w, i.e., $w^T \cdot w$.

Introducing a Lagrangian multiplier to solve Equation (4) results in Equation (5):

$$L(w, b, \alpha) = \frac{1}{2}\|w\|^2 - \sum_{i=1}^{l} \alpha_i\{[(x_i \cdot w) - b]y_i - 1\} \quad (5)$$

A dual problem must be solved that minimizes Lagrangian function (w, b, α) of Equation (5) with respect to w and b and maximizes it with respect to α. First, by satisfying the constraint that minimizes the Lagrangian function (w, b, α) with respect to w and b, two conditions can be obtained as shown in Equation (6):

$$\frac{\partial L}{\partial b} = 0 \Rightarrow \sum_{i=1}^{l} \alpha_i y_i = 0 \quad (6)$$

$$\frac{\partial L}{\partial w} = 0 \Rightarrow w = \sum_{i=1}^{l} \alpha_i x_i y_i$$

Substituting the conditions obtained by Equation (6) into Equation (5) gives Equation (7):

$$\bar{\alpha} = \arg\min_{\alpha} \frac{1}{2}\sum_{i=1}^{l}\sum_{j=1}^{l}\alpha_i\alpha_j y_i y_j (x_i \cdot x_j) - \sum_{i=1}^{l}\alpha_i \quad (7)$$

$$\text{subject to } \sum_{i=1}^{l}\alpha_i y_i = 0$$

$w(\bar{w})$ and $b(\bar{b})$ for an optimal hyperplane are defined by Equation (8) using $\bar{\alpha}$:

$$\bar{w} = \sum_{i=1}^{l}\bar{\alpha}_i x_i y_i \quad (8)$$

$$\bar{b} = \frac{1}{2}\bar{w} \cdot [x_r + x_s]$$

where $x_r$ and $x_s$ are support vectors that are data points where a target value $y_i$ is 1 and −1.

An optimal hyperplane is expressed by Equation (9), and the left-hand term obtained when the optimal hyperplane is represented by an implicit function ('an expression describing the hyperplane') is defined by f(x) in Equation (10):

$$\bar{w} \cdot x - \bar{b} = 0 \quad (9)$$

$$f(x) = \bar{w} \cdot x - \bar{b} \quad (10)$$

Since points where f(x)=0 construct the optimal hyperplane defined by Equation (9), an input facial image is determined to be the same as a facial image of a specific person when f(x) is greater than 0 while it is not determined to be the same as that of the specific person when f(x) is less than 0.

As described above, training data sets, i.e., Gabor-filtered vectors for training images, are linearly separable. When the training data sets are not linearly separable, a kernel function may be used. In this case, $\bar{\alpha}$ in Equation (7) is expressed in Equation (11):

$$\bar{\alpha} = \arg\min_{\alpha} \frac{1}{2}\sum_{i=1}^{l}\sum_{j=1}^{l}\alpha_i\alpha_j y_i y_j k(x_i \cdot x_j) - \sum_{i=1}^{l}\alpha_i \quad (11)$$

$$\text{subject to } \sum_{i=1}^{l}\alpha_i y_i = 0$$

where $k(x_i \cdot x_j) = \Phi(x_i) \cdot \Phi(x_j)$ and $\Phi(x)$ is a spatial transform function. By using the result of Equation (11), a hyperplane can be obtained in the same way as when input data is linearly separable.

To determine the identity of a facial image, the determination unit 42 substitutes an input Gabor-filtered vector into an equation describing the optimal hyperplane such as Equation (10) and determines whether the resultant value exceeds a predetermined threshold. The threshold may be 0. However, to prevent 'false positive' in which a facial image is misidentified as belonging to the same person, the threshold may be greater than 0. The threshold can be suitably selected for each face recognition case using an empirical statistical method.

In FIGS. 1 through 3, various components may be, but are not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. The functionality provided for in the components and modules may be combined into fewer components and modules or further separated into additional components and modules. In addition, the components and modules may be implemented such that they execute one or more computers in a communication system.

Figure 5:
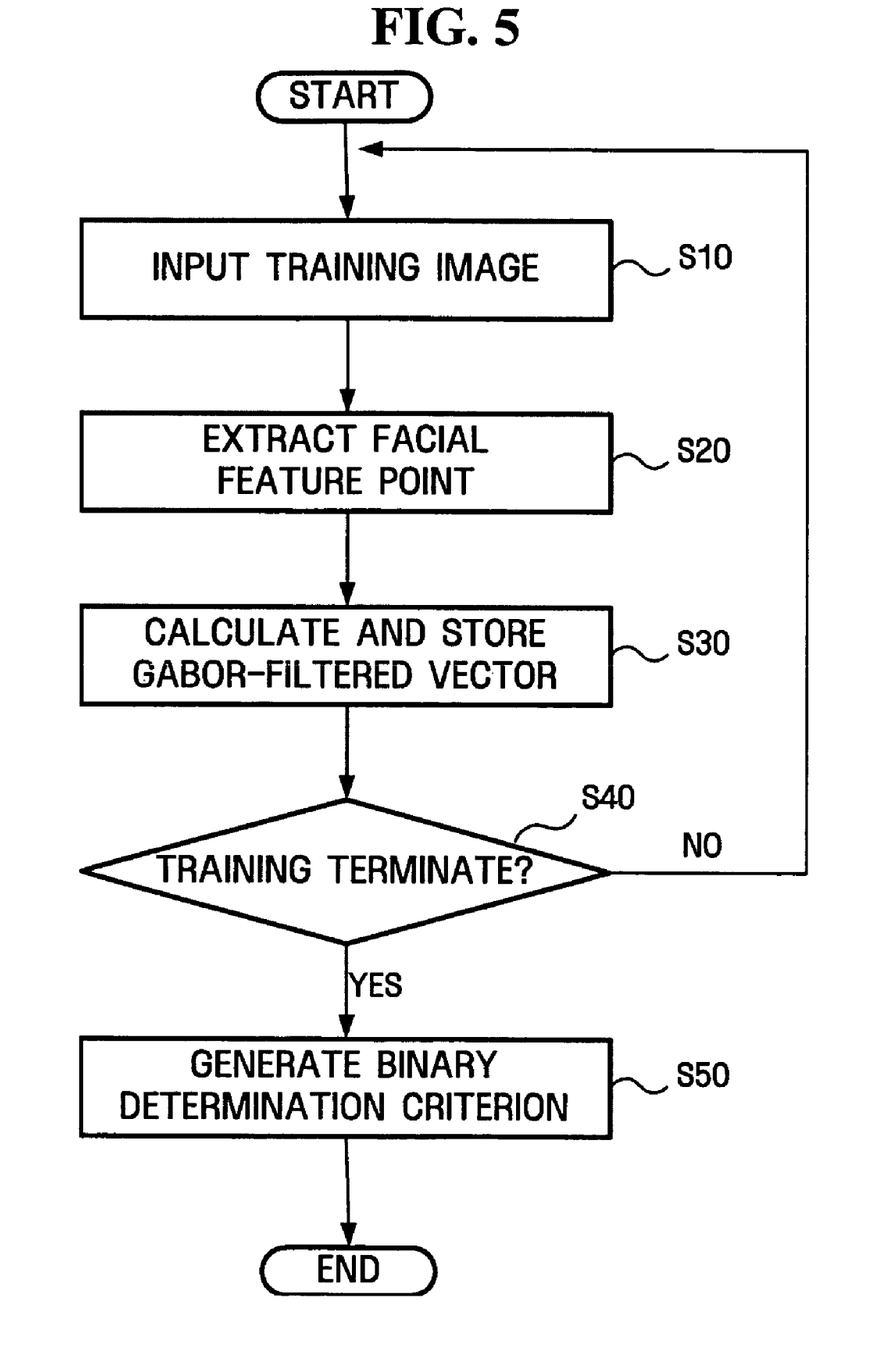
FIG. 5 is a flowchart illustrating a process of generating a binary determination criterion according to an embodiment of the present invention.

FIG. 5 is a flowchart illustrating a process of generating a binary determination criterion according to an embodiment of the present invention.

Referring to FIGS. 1 and 5, in operation S10, the image receiver 10 receives a training image and transforms the same into digital pixel values.

In operation S20, the face localizer 20 extracts a facial region from the transformed digital pixel values and then a predetermined number of feature points that are to be subjected to Gabor filtering from the facial region. Before extracting the feature points from the facial region, face size conversion or histogram equalization may be additionally performed.

In operation S30, the Gabor filter unit 30 applies a set of Gabor filters with a plurality of orientations and frequencies to each of the facial feature points in order to obtain responses and obtains a Gabor-filtered vector by representing the responses by a 1-D vector or array. The Gabor-filtered vector is then stored in the training data set storage 50.

In this case, when all training procedures terminate in operation S40, the process proceeds to operation S50 because there is no need to input a training image. When all training procedures do not terminate in operation S40, the process returns to the operation S10 in order to receive a training image.

In operation S50, the training unit 41 of the binary classifier 40 generates a binary determination criterion using Gabor-filtered vectors stored in the training data set storage 50 for a plurality of training images. When the binary classifier 40 is a SVM classifier, the training unit finds an optimal hyperplane. The training unit 41 provides the binary determination criterion to the determination unit 42 of the binary classifier 40. Subsequently, when an image to be recognized is input, the determination unit 42 may determine whether an input facial image belongs to a specific person (the identity of the facial image).

Figure 6:
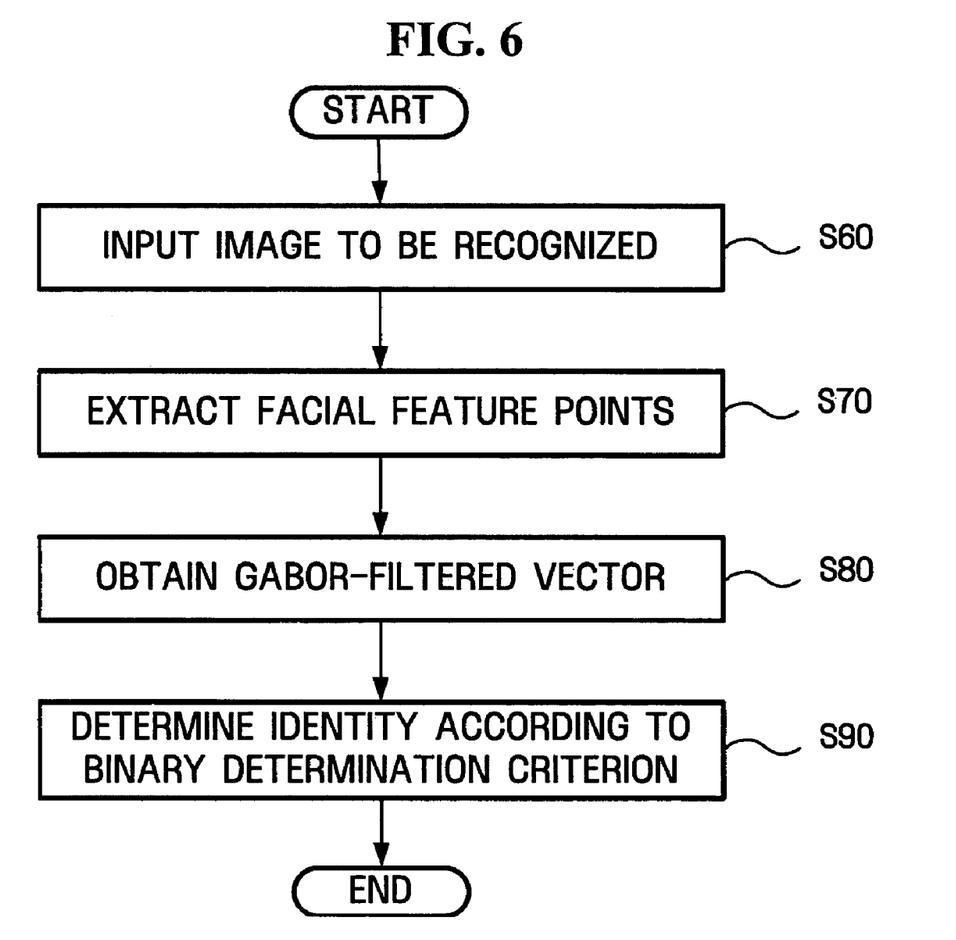
FIG. 6 is a flowchart illustrating a process of determining the identity of an image to be recognized according to an embodiment of the present invention.

FIG. 6 is a flowchart illustrating a process of determining the identity of an image to be recognized according to an embodiment of the present invention.

Referring to FIG. 6, in operation S60, the image receiver 10 receives an image to be recognized and transforms the same into digital pixel values.

In operation S70, the face localizer 20 extracts a facial region from the transformed digital pixel values and then a predetermined number of feature points that are to be subjected to Gabor filtering from the facial region.

Like in the operation S20 shown in FIG. 5, before extracting the feature points from the facial region, face size conversion or histogram equalization may be additionally performed.

In operation S80, the Gabor filter unit 30 applies a set of Gabor filters with a plurality of orientations and frequencies to each of the facial feature points in order to obtain responses and obtains a Gabor-filtered vector by representing the responses by a 1-D vector or array. The Gabor-filtered vector is then provided to the determination unit 42 of the binary classifier 40.

In operation S90, the determination unit 42 applies the binary determination criterion provided by the training unit 41 to the Gabor-filtered vector provided by the Gabor filter unit 30 and determines whether an input facial image belongs to the same person. When a SVM classifier is used as the binary classifier 40, the determination unit 42 substitutes an input Gabor-filtered vector into an equation describing the optimal hyperplane and determines whether the resultant value exceeds a predetermined threshold.

The present invention provides a face recognition apparatus and method that are robust to external illumination variations while providing high recognition accuracy.

In addition, the present invention combines the advantages of both Gabor filter and binary classifier.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A face recognition apparatus, comprising:
   a face localizer extracting a predetermined number of feature points from a facial region extracted from an input image to be recognized;
   a Gabor filter unit applying a set of Gabor filters with a plurality of orientations and frequencies to each of the facial feature points in order to obtain filter responses and thereby generating a one-dimensional (1-D) vector including the filter responses of the input image to be recognized;
   a training data set storage storing a plurality of gabor-filtered 1-D vectors that are obtained from a plurality of training images; and
   a binary classifier generating a binary determination criterion using the plurality of gabor-filtered 1-D vectors stored in the training data set storage, applying the binary determination criterion to the gabor-filtered 1-D vector of the input image to be recognized, and selectively determining whether the facial region extracted from the input image to be recognized belongs to a specific person or does not belong to the specific person based on the application of the binary determination criterion, wherein the binary classifier separates the plurality of gabor-filtered 1-D vectors into one of a first class in which it is determined that a facial image belongs to a specific person and into a second class in which it is determined that a facial image does not belong to the specific person.

2. The apparatus of claim 1, wherein the face localizer comprises:
   a face detector detecting a specific component of a face from the input image;
   a facial region extractor extracting a facial region to maintain a predetermined ratio with respect to the location of the specific facial component; and
   a feature point extractor extracting a predetermined number of feature points that are to be subjected to Gabor filtering from the extracted facial region.

3. The apparatus of claim 2, wherein the face localizer further comprises:
   a face size converter converting either or both of the size of the extracted facial region and the size of a Gabor filter that will be subsequently applied to maintain a predetermined ratio between them; and
   an image preprocessor applying histogram equalization to the converted facial region and providing the result of reducing the effect of illumination to the feature point extractor.

4. The apparatus of claim 2, wherein the location of the specific component is the location of both eyes within the face.

5. The apparatus of claim 2, wherein the feature points are extracted from the facial region to increase the difference in a Gabor-filtered output between input facial images.

6. The apparatus of claim 1, wherein the numbers of the plurality of orientations and frequencies are 8 and 5, respectively.

7. The apparatus of claim 1, wherein the training data set storage stores the 1-D vectors together with a target value in the 1-D vectors.

8. The apparatus of claim 1, wherein the binary classifier is a Support Vector Machines (SVM) classifier.

9. The apparatus of claim 1, wherein the binary classifier comprises:
   a training unit obtaining an optimal hyperplane that maximizes the distance between the hyperplane and the nearest data point among hyperplanes including the stored 1-D vectors; and
   a determination unit substituting the 1-D vectors into an equation describing the optimal hyperplane and determining whether the resultant value exceeds a predetermined threshold.

10. The apparatus of claim 9, wherein when the stored 1-D vectors are non-linearly separable data, the training unit performing spatial transform using a kernel function and obtaining an optimal hyperplane.

11. A face recognition method implemented by a face recognition apparatus, the method comprising:
   extracting a predetermined number of feature points from a facial region extracted from an input image to be recognized;
   applying a set of Gabor filters with a plurality of orientations and frequencies to each of the facial feature points and obtaining filter responses;
   generating one-dimensional (1-D) vector including the filter responses of the input image to be recognized;
   storing a plurality of gabor-filtered 1-D vectors that are obtained from a plurality of training images;
   generating a binary determination criterion using the stored plurality of gabor-filtered 1-D vectors; and
   applying the binary determination criterion to the gabor-filtered 1-D vector of the input image to be recognized using the face recognition apparatus; and
   determining whether the facial region extracted from the input image to be recognized belongs to a specific person or does not belong to the specific person based on the applying of the binary determination criterion, wherein the plurality of gabor-filtered 1-D vectors are separated into one of a first class in which it is determined that a facial image belongs to a specific person and into a second class in which it is determined that a facial image does not belong to the specific person.

12. The method of claim 11, wherein the extracting of the predetermined number of feature points comprises:
   detecting a specific component of a face from the input image;
   extracting a facial region to maintain a predetermined ratio with respect to the location of the specific facial component; and extracting a predetermined number of feature points that are to be subjected to Gabor filtering from the extracted facial region.

13. The method of claim 12, wherein the feature points are selected mainly within a portion of the facial region that reacts sensitively to a Gabor filter through experiments.

14. The method of claim 11, wherein in the storing of the 1-D vectors, the 1-D vector are stored together with a target value in the 1-D vectors.

15. The method of claim 11, wherein the generating of the binary determination criterion comprises obtaining an optimal hyperplane using the stored 1-D vectors.

16. The method of claim 11, wherein the applying of the binary determination criterion to the 1-D vectors in order to determine the identity of the image comprises:

substituting the 1-D vectors into an equation describing the optimal hyperplane when the gabor-filtered 1-D vectors are obtained from the image to be recognized; and determining the identity of the image to be recognized based on whether the resultant value exceeds a predetermined threshold.

17. The method of claim 16, wherein when the stored 1-D vectors are non-linearly separable, the generating of the binary determination criterion comprises performing spatial transform using a kernel function and obtaining an optimal hyperplane.

18. A non-transitory recording medium having a computer readable program recorded therein, the program for executing the method of claim 11.

19. A method implemented by a face recognition apparatus, the method comprising:

extracting a predetermined number of feature points from a facial region extracted from an input image to be recognized;

applying a set of Gabor filters with a plurality of orientations and frequencies to each of the extracted facial feature points so as to obtain filter responses and thereby generating a one-dimensional (1-D) vector including the filter responses of the input image to be recognized;

inputting a plurality of training images to generate a plurality of gabor-filtered 1-D vectors;

generating a binary determination criterion using the plurality of gabor-filtered 1-D vectors;

applying the binary determination criterion to the gabor-filtered 1-D vector of the input image to be recognized, using the face recognition apparatus; and determining whether the facial region extracted from the input image to be recognized belongs to a specific person or does not belong to the specific person based on the applying of the binary determination criterion, wherein the plurality of gabor-filtered 1-D vectors are separated into one of a first class in which it is determined that a facial image belongs to a specific person and into a second class in which it is determined that a facial image does not belong to the specific person.

* * * * *